April 23, 1929.    C. WETZEL    1,710,559
AXLE BEARING
Filed Sept. 26, 1927
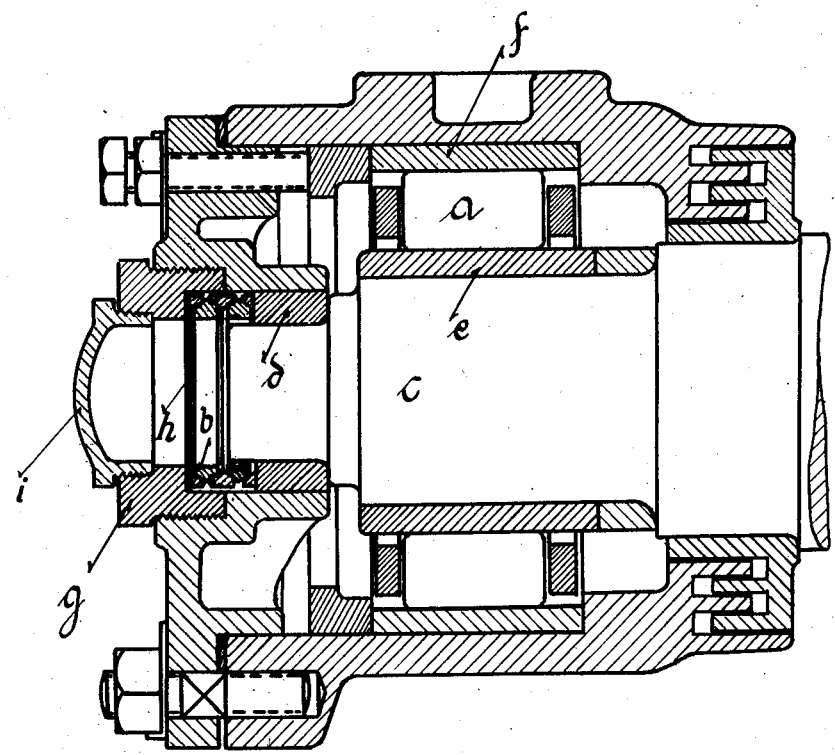

Patented Apr. 23, 1929.

1,710,559

UNITED STATES PATENT OFFICE.

CARL WETZEL, OF ZURICH, SWITZERLAND, ASSIGNOR TO G. & J. JAEGER AKTIENGE-SELLSCHAFT, OF ELBERFELD, GERMANY, A COMPANY OF GERMANY.

AXLE BEARING.

Application filed September 26, 1927, Serial No. 222,073, and in Germany November 15, 1925.

The invention relates to an axle bearing with spring means for sustaining the axial pressures and is distinguished from known constructions of this kind in that the axial shocks and blows falling on the bearing are taken by a set of ring springs. The use of ring springs to receive the axial blows and shocks falling on the bearing has the important advantage over the means hitherto used for this purpose, such as the provision of special thrust bearings, the use of flanged rollers or shouldered bearings, as well as thrust reception by means of plate or spiral springs, in that the axial shocks and blows are not only received by springs but at the same time are for the most part damped or braked. This spring reception and simultaneous damping of the shock or pressure is of importance in axle bearings over unbraked spring reception not only in that the bearing elements, rollers and so forth are considerably spared and submitted only to radial stresses, but also in particular that on the occurrence of axial shocks the bearings immediately come to rest and do not swing to and fro for a long period as takes place for example in railway vehicles in passing over curves when the bearings are provided with unbraked springs for taking axial pressures.

As an example of the invention, the accompanying drawing shows in section an axle box in which the radial loads are taken by rollers $a$ while axial shocks are transmitted to ring springs $b$ and are there damped. The ring springs $b$ consist of outer and inner concentric sets of rings having inclined or wedge-shaped surfaces for engagement in such manner that when the springs are placed under axial pressure and caused to collapse the outer springs will be expanded or placed under tension and the inner springs contracted and placed under compression, thus producing a cushioning or shock-absorbing action, the rings when relieved from compression returning to normal position. A bush $d$ forms a bearing for the outer reduced end $c'$ of the axle spindle and serves to transmit pressure between the axle and the ring springs, while a sleeve $e$ forming the running race for the rollers, is mounted on the body of the axle spindle $c$. In the bearing or the cover thereof are the outer race $f$ and the screwed ring spring abutment $g$. The rollers have free play axially in relation to the axle box. The running races can be firmly fixed in position. They remain fixed on the shaft or in the box during mounting and de-mounting of the roller bearing. The ring spring can be removed and examined after unscrewing the abutment $g$. If the abutment is screwed into the cover to its limit fine adjustment or preloading of the spring can be effected if necessary by the insertion of shims $h$. If the ring spring and interior are simply to be inspected, it suffices to unscrew the cap $i$.

I claim:—

1. In an axle bearing, a housing having an opening, a set of ring springs in the housing for receiving and damping shocks, an axle spindle, a spindle bearing member forming an inner movable abutment for transmitting axial pressures from the spindle to said set of ring springs, and an outer abutment for the springs removably fitted in said opening.

2. In an axle bearing a set of ring springs for receiving and damping shocks, a sleeve for transmitting axial pressures to said set of ring springs, a screwed abutment for said set of ring springs, and an inspection cap in said abutment.

3. In a journal axle bearing, a housing, a set of ring springs for receiving and damping shocks, a screwed abutment in said housing backing up said springs and a sleeve for transmitting axial pressures from the journal to said set of ring springs.

4. In a journal axle bearing, a housing, a set of ring springs for receiving and damping shocks, a screwed abutment in said housing backing up said springs, a sleeve for transmitting axial pressures from the journal to said set of ring springs, and an inspection cap screwed into said abutment.

In testimony whereof I have signed my name to this specification.

CARL WETZEL.